(12) United States Patent
Beauchamp

(10) Patent No.: US 11,321,768 B2
(45) Date of Patent: May 3, 2022

(54) METHODS AND SYSTEMS FOR AN E-COMMERCE PLATFORM WITH AUGMENTED REALITY APPLICATION FOR DISPLAY OF VIRTUAL OBJECTS

(71) Applicant: Shopify Inc., Ottawa (CA)

(72) Inventor: Daniel Beauchamp, Huntsville (CA)

(73) Assignee: Shopify Inc., Ottawa (CA)

( * ) Notice: Subject to any disclaimer, the term of this patent is extended or adjusted under 35 U.S.C. 154(b) by 444 days.

(21) Appl. No.: 16/229,369

(22) Filed: Dec. 21, 2018

(65) Prior Publication Data

US 2020/0202419 A1   Jun. 25, 2020

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06F 3/04815* (2013.01); *G06Q 30/06* (2013.01);
(Continued)

(58) Field of Classification Search
CPC ...... G06Q 30/0601–0645; G06Q 30/08; G06F 3/04815; G06K 9/00201
(Continued)

(56) References Cited

U.S. PATENT DOCUMENTS 8,878,846 B1 * 11/2014 Francis, Jr. ............ G06T 19/006
345/420
9,129,404 B1   9/2015 Wagner
(Continued)

FOREIGN PATENT DOCUMENTS

WO   2013063299 A1   5/2013
WO   2016077798 A1   5/2016

OTHER PUBLICATIONS

Mottl, Judy, Wayfair advances AR strategy with mobile app 3D feature, Dec. 12, 2017, retailCustomerExperience, accessed at [https://www.retailcustomerexperience.com/articles/wayfair-advances-ar-strategy-with-mobile-app-3d-feature/] (Year: 2017).*
(Continued)

*Primary Examiner* — Jeffrey A. Smith
*Assistant Examiner* — Lindsey B Smith
(74) *Attorney, Agent, or Firm* — GTC Law Group PC & Affiliates

(57) ABSTRACT

Disclosed are systems and methods for augmenting a customer image with at least one virtual object. One or more customer images depicting a customer environment are received from a customer computing device and 3D feature data for the customer images is determined. A virtual object is determined which corresponds to a desired merchant item. A positioning signal is received which corresponds to a desired location of virtual object in the customer environment, and a corresponding first location in each customer image at which to overlay the virtual object using the positioning signal is determined. An appropriate size and orientation of the virtual object is determined for each customer image based on corresponding 3D feature data, causing an overlay of an appropriately sized and oriented virtual object at the corresponding first location in customer images.

24 Claims, 8 Drawing Sheets

(51) Int. Cl.
*G06F 3/04815* (2022.01)
*G06V 20/64* (2022.01)

(52) U.S. Cl.
CPC ..... *G06Q 30/0601* (2013.01); *G06Q 30/0641* (2013.01); *G06V 20/64* (2022.01)

(58) Field of Classification Search
USPC ............................................... 705/26.1–27.2
See application file for complete search history.

(56) References Cited

U.S. PATENT DOCUMENTS

| | | | |
|---|---|---|---|
| 9,734,634 B1 | 8/2017 | Mott et al. | |
| 10,319,150 B1* | 6/2019 | Canada | G06T 11/00 |
| 2008/0071559 A1 | 3/2008 | Arrasvuori | |
| 2011/0258338 A1* | 10/2011 | Vass | H04N 21/2405 |
| | | | 709/233 |
| 2012/0120113 A1 | 5/2012 | Hueso | |
| 2013/0259308 A1 | 10/2013 | Klusza et al. | |
| 2015/0170260 A1* | 6/2015 | Lees | G06F 3/017 |
| | | | 705/27.2 |
| 2015/0332509 A1* | 11/2015 | Jovanovic | G06F 3/0488 |
| | | | 345/427 |
| 2018/0330544 A1* | 11/2018 | Corso | G06Q 30/0643 |
| 2019/0197599 A1* | 6/2019 | Zia | G06Q 30/0643 |

OTHER PUBLICATIONS 19215007.6, "European Application Serial No. 19215007.6, Extended European Search Report dated Apr. 9, 2020", Shopify Inc., 10 pages.

Satkin, et al., "3DNN: 3D Nearest Neighbor", International Journal of Computer Vision, vol. 111, Kluwer Academic Publishers, Norwell, US, Jul. 22, 2014, pp. 69-97.

Weiss, et al., "Automated Layout Synthesis and Visualization from Images of Interior or Exterior Spaces", 2017 IEEE Conference on Computer Vision and Pattern Recognition Workshops (CVPRW), IEEE, Jul. 21, 2017, pp. 41-47.

* cited by examiner

FIG. 2

E-Commerce Platform

🔍 Search

⌂ Home
▢ Orders (652)
◇ Products
○ Customers
⌗ Reports
⊛ Discounts
⊞ Apps

SALES CHANNELS ⊕
🏬 Online Store
▢ Mobile App
View all channels

⚙ Settings

JG John's Apparel
   Jonny B. Good

All channels ▾    Today ▾

Good afternoon, Jonny B..
Here's what's happening
with your store today.

Today's total sales    Today's visits
$98.00                 1

• Update your Platform Payments tax details
  We require additional information to verify your identity.
  [ Update tax details ]

• Advanced Cash on Delivery has been deactivated for
  your store
  [ See why ]

• Pinterest has been disabled. Review its eligibility
  requirements to find out how to enable it again.

TOTAL SALES
$98.00                              Jun 1
                                    2 orders
$125
$75
$25
      12am    8am    4pm    11pm TOTAL SALES BY CHANNEL              Jun 1

Online Store         View dashboard
$0.00                0 orders

Mobile App
$0.00                0 orders

Shopify POS (126 York St.)
$0.00                0 orders

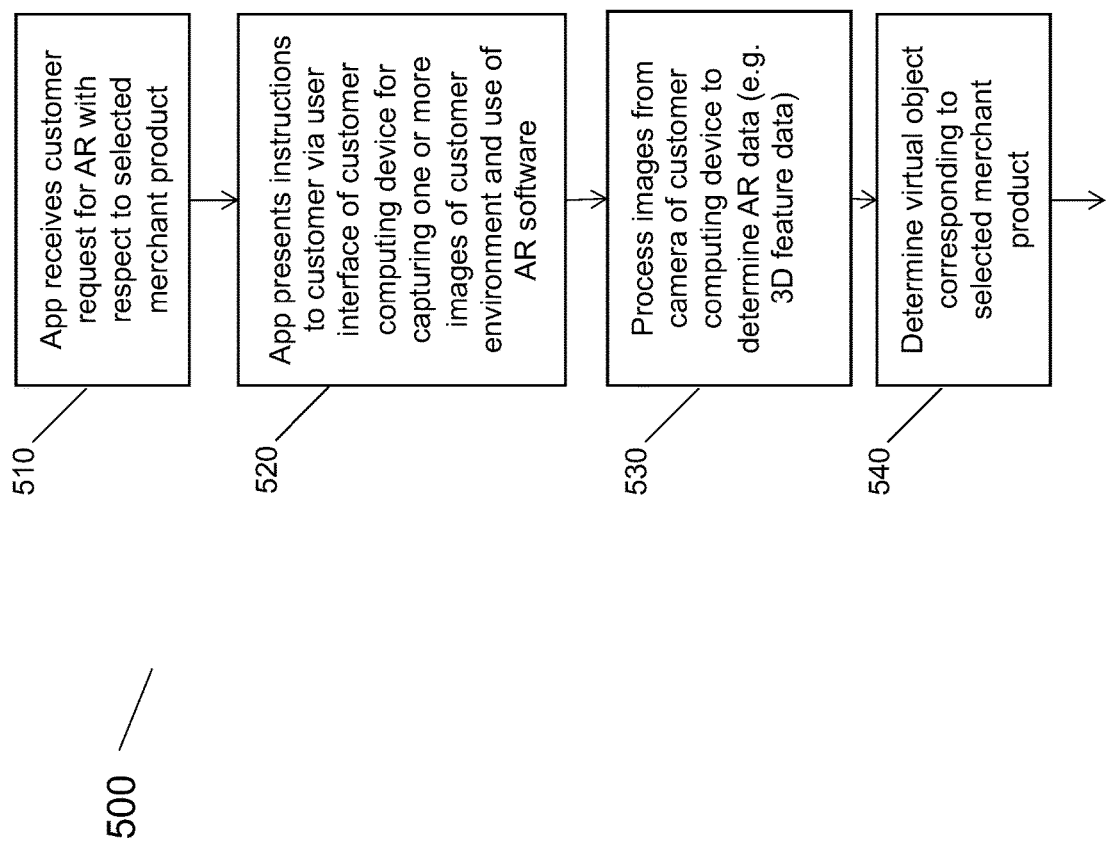

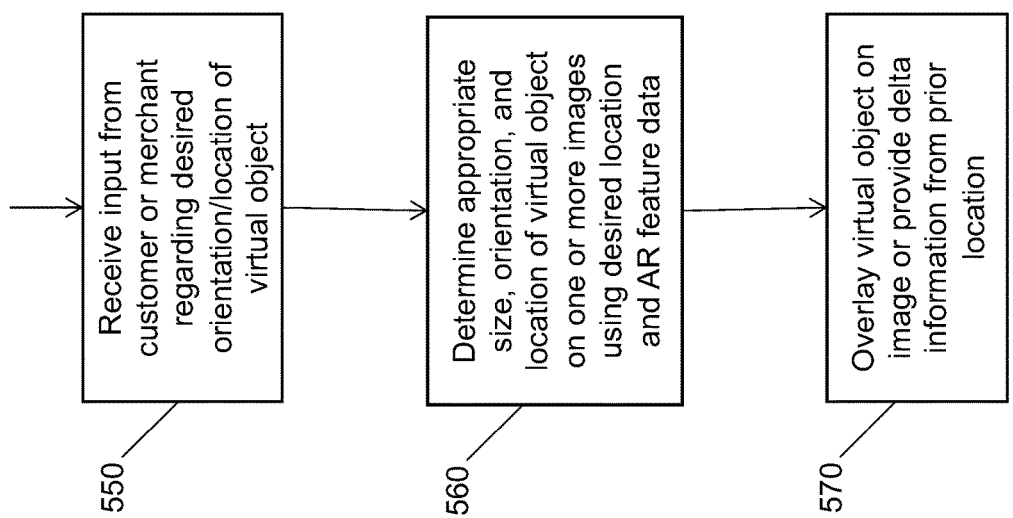

METHODS AND SYSTEMS FOR AN E-COMMERCE PLATFORM WITH AUGMENTED REALITY APPLICATION FOR DISPLAY OF VIRTUAL OBJECTS

FIELD

The present disclosure relates generally to augmenting reality with virtual objects, and in particular, augmenting one or more images depicting a customer environment with a virtual object corresponding to a merchant item for sale.

BACKGROUND

Known augmented reality (AR) systems generally provide an interactive experience of a real-world environment where objects that reside in the real-world are "augmented" by computer-generated perceptual information, such as across visual and/or auditory modalities. An overlaid visual can be constructive (i.e. additive to the environment) or destructive (subtractive from the environment), and is typically seamlessly interwoven with the real world environment in a way that it is perceived as an immersive aspect of the real environment. In this way, augmented reality may alter a person's ongoing perception of the real world environment. This is in comparison to virtual reality systems, which generally completely replace a user's real world environment with a simulated one. Typically, augmented and virtual reality systems make use of headsets or special glasses, and require 3D cameras, generation of complex 3D models, and advanced and computationally intensive processing techniques such as object recognition or registration of images. Such systems are typically complex and expensive.

SUMMARY

Therefore, there is a need in the art for simplified augmented reality systems and methods using generally available cameras and devices, and which do not require creation of a 3D model or computationally intensive processing. Such simplified systems and methods may utilize simple and readily available personal computing devices such as laptops, tablets, and mobile phones, may make use of readily available AR functionality, software and hardware, would not require intensive computational processing, may occur in real-time or asynchronously, and would not require specialized equipment such as glasses or a headset for operation. Such a simplified system may be used for the display of virtual objects in a customer environment, wherein the customer environment is provided and controlled by a customer, and wherein the virtual objects correspond to merchant items for sale, allowing for a customer, and in certain cases a merchant, to view and interact with the virtual object in the customer's environment.

In embodiments, a computer-implemented method for augmenting an image of a site with a virtual object may include receiving an image from a first computing device, wherein the image depicts a potential site for the virtual object and determining 3D feature data corresponding to a portion of the image. A selection of a virtual object for display may be received and a positioning signal corresponding to a desired location of the virtual object may be received. A first location in the image at which to overlay the virtual object using the positioning signal may be determined. An appropriate size and orientation of the virtual object in the image based on the 3D feature data may be determined. An augmented image may be created for display on the first computing device by overlaying an appropriately sized and oriented virtual object at the first location in the image.

In embodiments, the augmented image may be enabled to be displayed on a second computing device. The method may further include receiving a second positioning signal from the first computing device or the second computing device which is indicative of a desired positioning of the virtual object or a component part of the virtual object in the augmented image. A second location in the augmented image of the site at which to overlay the virtual object or a component part of the virtual object in response to the second positioning signal may be determined. An updated augmented image may be created in real time for display on the first computing device or the second computing device by overlaying the virtual object or a component part of the virtual object at the second location. In embodiments, the 3D feature data may include a determined coordinate system relative to a camera of the first computing device. The 3D feature data may include location and size of planar surfaces.

In embodiments, a computer-implemented method for augmenting a customer image with at least one virtual object may include receiving one or more customer images from a customer computing device, wherein the one or more customer images each depicts a customer environment and determining 3D feature data corresponding to each of the one or more customer images. A selection of a merchant item for display may be received, and a virtual object corresponding to the selection of a merchant item may be determined. A positioning signal corresponding to a desired location of virtual object in the customer environment may be received and a first location in each of the one or more customer images at which to overlay the virtual object using the positioning signal may be determined. An appropriate size and orientation of the virtual object in each of the one or more customer images may be determined based on corresponding 3D feature data, and the method may include causing an overlay of an appropriately sized and oriented virtual object at the corresponding first location in each of the one or more customer images.

In embodiments, causing the overlay includes transmitting at least one of the appropriately sized and oriented virtual object and the first location to the customer computing device. The customer computing device and the merchant computing device may be in a peer to peer relationship.

In embodiments, a re-positioning signal may be received from at least one of the customer computing device, a merchant computing device, and another computing device, wherein the repositioning signal is indicative of a desired re-positioning of the virtual object. A second location may be determined in one or more image frames of the customer image at which to overlay the virtual object in response to the re-positioning signal. In embodiments, a method includes causing an updated overlay of an appropriately sized and oriented virtual object at the corresponding second location in each of the one or more customer images. In embodiments, causing the updated overlay may include transmitting at least one of the appropriately sized and oriented virtual object and the second location to the customer computing device. In embodiments, an updated augmented image may be created for one or more customer images with the updated overlay for display on the customer computing device and/or on the merchant computing device. An augmented image for one or more customer images may be created with the overlay, wherein the augmented image is created upon receipt of one or more customer images from a customer computing device. In embodiments, an augmented image for the one or more customer images may be created and displayed at a different time than the receipt of the one or more customer images from a customer computing device.

In embodiments, a computer-implemented method for augmenting an image of a site with a virtual object may include capturing an image by a first computing device, wherein the image depicts a potential site for a virtual object and determining, by the first computing device, 3D feature data corresponding to a portion of the image. The image and the 3D feature data may be communicated to a second computing device, wherein the second computing device is in a peer to peer relationship with the first computing device. The second computing device may determine a first location in the image at which to overlay the virtual object and an appropriate size and orientation of the virtual object in the image based on the 3D feature data. An augmented image may be created by the first or second computing device for display on the first and/or second computing device by overlaying an appropriately sized and oriented virtual object at the first location in the image.

In embodiments, a system for augmenting an image of a site with a virtual object may include an interface module that is configured to receive an image from a first computing device, wherein the image depicts a potential site for the virtual object, receive a virtual object for display, and receive a positioning signal corresponding to a desired location of the virtual object. The system may also include a computing module that is configured to determine 3D feature data corresponding to a portion of a received image, determine a first location in the image at which to overlay the virtual object using the positioning signal, determine an appropriate size and orientation of the virtual object in the image based on the 3D feature data, and cause an overlay of an appropriately sized and oriented virtual object at the first location in the image.

In embodiments, the computing module is structured to transmit at least one of the appropriately sized and oriented virtual object and the first location to the customer computing device. In embodiments, the computing module is structured to create an augmented image for one or more customer images with the overlay for display on the customer computing device.

The computing module may be structured to create an augmented image for display on the first computing device by overlaying an appropriately sized and oriented virtual object at the first location in the image. In embodiments, the interface module may receive a second positioning signal from the first computing device or the second computing device which is indicative of a desired positioning of the virtual object or a component part of the virtual object in the augmented image. The computing module may determine a second location in the augmented image of the site at which to overlay the virtual object or a component part of the virtual object in response to the second positioning signal, and may create an updated augmented image in real time for display on one of the first computing device and the second computing device by overlaying the virtual object or a component part of the virtual object at the second location. In embodiments, the 3D feature data may include a determined coordinate system relative to a camera of the first computing device. The 3D feature data may include location and size of planar surfaces.

In embodiments, a computer-implemented system for augmenting a customer image with at least one virtual object may include an interface module enabled to receive one or more customer images from a customer computing device, wherein the one or more customer images each depicts a customer environment, receive a selection of a merchant item for display, receive a positioning signal corresponding to a desired location of virtual object in the customer environment. The system may further include a computing module that is configured to determine 3D feature data corresponding to each of the one or more customer images, determine a virtual object corresponding to the selection of a merchant item, determine a first location in each of the one or more customer images at which to overlay the virtual object using the positioning signal, determine an appropriate size and orientation of the virtual object in each of the one or more customer images based on corresponding 3D feature data, and cause an overlay of an appropriately sized and oriented virtual object at the first location in the image and/or create an augmented image for each of the one or more customer images for display on the customer computing device by overlaying an appropriately sized and oriented virtual objection at the corresponding first location in each of the one or more customer images. In embodiments, one or more augmented images may be enabled for display on a merchant computing device. In embodiments, the customer computing device and the merchant computing device may be in a peer to peer relationship. The interface module may receive a re-positioning signal from the customer computing device, the merchant computing device, or another computing device which is indicative of a desired re-positioning of the virtual object, and the computing module may determine a second location in one or more image frames of the customer image at which to overlay the virtual object in response to the re-positioning signal and may create one or more updated augmented images in real time by overlaying an appropriately sized and oriented virtual object at the second location. At least one augmented image may be created in real time with the receipt of one or more customer images from a customer computing device. The augmented image for each of the one or more customer images may be created and displayed at a different time than the receipt of the one or more customer images from a customer computing device.

BRIEF DESCRIPTION OF THE FIGURES

FIG. 2 depicts an embodiment of a home page of an administrator.

FIGS. 5*a-b* depict another example of a process for the exemplary application of FIG. 3.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
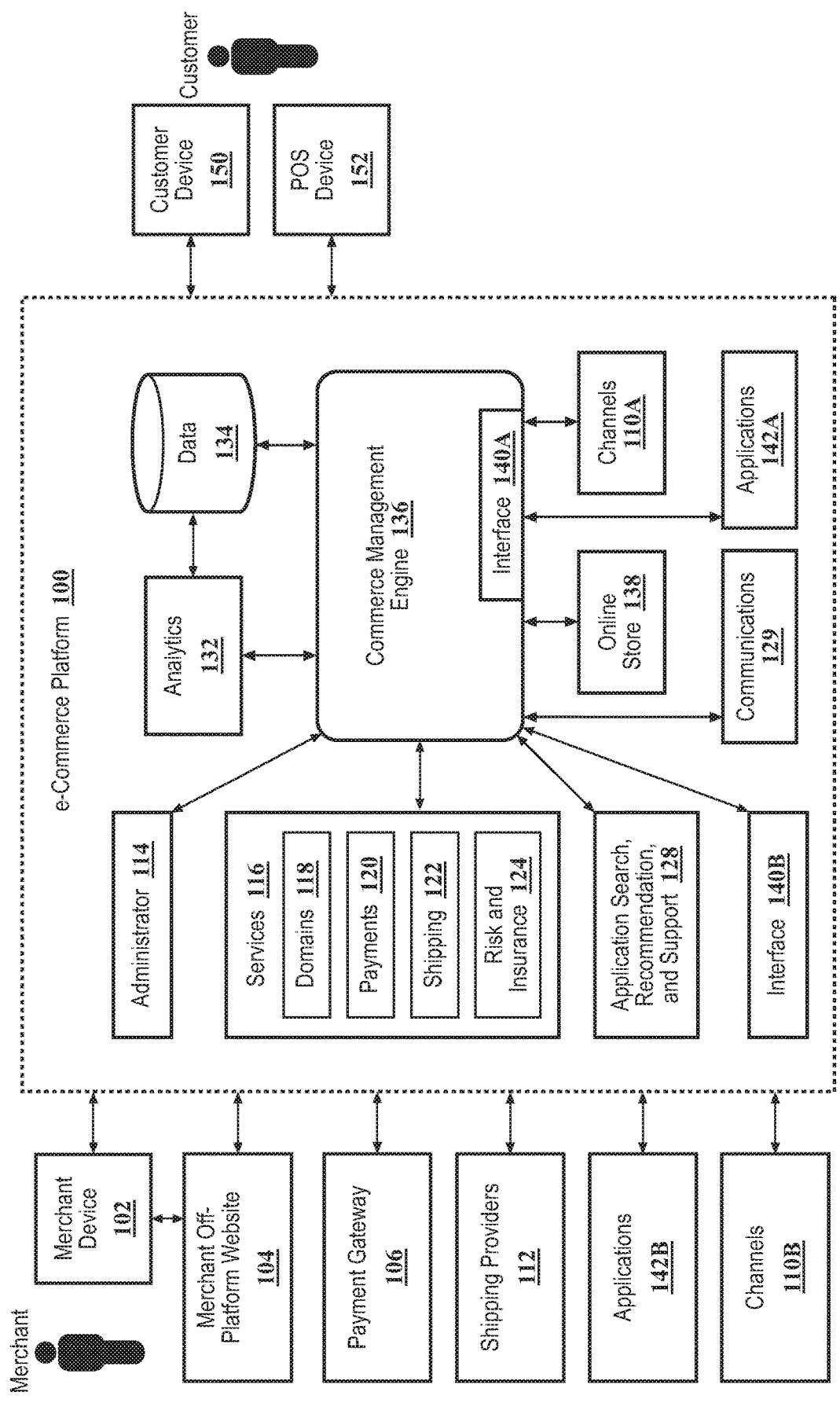
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, applications, and process disclosed to view, evaluate, and purchase both products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and evaluating products and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through applications 142A-B, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through various features of the platform or stand-alone applications, dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality). In embodiments, features or applications of the platform may be implemented via a peer to peer network, such as between a customer device and a merchant device.

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancellation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products, have them evaluated, and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, evaluates one or more products such as via an augmented reality application, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view, evaluate, and buy products. In embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface or application, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide an augmented reality application for permitting customers to view various products as virtual objects in a customer environment. In particular, the e-commerce platform 100 may provide an option to users to interact with an augmented reality application 300 (shown in FIG. 3), which allows customer users or merchant users to select a desired item for view as a virtual object in one or more images that are customer-supplied. In embodiments, an augmented reality application may be provided to allow direct interaction between a customer device and a merchant device. For ease of discussion, reference is made to a customer and a merchant, however, in embodiments it is understood that the disclosure applies to any two users (whether or not merchants or customers) and/or devices.

For example, a customer interested in a merchant product may be enabled to upload or share one or more images of the customer's environment, where, here and throughout the disclosure, the one or more images may be a single image, a set of separate images, or a set of video images. The one or more images may be recorded, uploaded from storage, or captured and shared in real time. As an example, a customer interested in a vase may share one or more images of a set of shelves in the customer's living room, using the camera on the customer's mobile computing device to capture one or more images of the set of shelves, or to capture a video of the shelves from various viewpoints, wherein the video may be streamed in real time, and the augmented reality application may operate to augment the customer supplied one or more images with a virtual object of the vase, such that an augmented one or more images may be created depicting the vase on one of the shelves. The augmented one or more images can be created and then displayed on the customer computing device (via a web browser or application interface or the like) and optionally can also be similarly displayed on a computing device of the merchant. The customer or the merchant, via their respective computing devices, may be able to provide control signals, such as touch screen inputs, mouse positioning, or the like, to position or reposition the vase, such as via a drag and drop action or other known manipulations. For example, the vase could be initially dragged and dropped at a position on a selected shelf, then repositioned and/or reoriented on the same or a different shelf or on another surface. The customer supplied one or more images of the customer environment may depict the set of shelves from various viewpoints in a room, allowing different perspectives of the vase at various positions on the shelves to be viewed in an augmented image, set of images, or video.

In another example, a customer interested in a merchant product, such as a refrigerator, may be enabled to upload or share (possibly in real time) one or more images of the customer's kitchen, and the augmented reality application may operate to provide the customer with a virtual refrigerator in place of an existing refrigerator or in a space provided for a refrigerator. The augmented one or more images can be displayed on the customer computing device and on a computing device of the merchant. The customer or the merchant, via their respective computing devices, may be able to provide control signals, such as touch screen inputs or the like, to manipulate and move the virtual refrigerator or various components of the virtual refrigerator, such as to insure that there are no impediments to the refrigerator being moved into the desired space, or to illustrate various features of the refrigerator by opening and closing various doors or drawers of the refrigerator. The customer supplied one or more images of the customer kitchen and the augmented customer kitchen may take the form of a single image, a set of images, or a video of the entire kitchen including surrounding entrances, doors, counters, and other appliances, allowing for an evaluation of the size, fit, and features of the refrigerator.

In another example, multiple parties may collaborate to display different products for a customer. For example, a customer may want design ideas for a room and a home furnishings merchant may partner with an interior designer to showcase various products, paint ideas, arrangements, and the like for a customer environment. The customer may be enabled to upload or share (possibly in real time) one or more images (including video or a video stream) of the customer's dining room, and the augmented reality application may enable collaboration with a home furnishings merchant as well as one or more interior designers, such as a furniture consultant and an art consultant. For example, a furniture consultant and an art consultant could operate together to provide the customer with various design arrangements including a dining table, various dining chairs, a chandelier, a rug, a hutch, framed artwork, sculptures, wall paint colors, and the like. The consultants could operate to add different virtual objects at the same time or sequentially. The various design arrangements could be presented as augmented images to be displayed on a customer computing device, on a computing device of the merchant, and on a computing device of the interior designer, either simultaneously or asynchronously. The augmented images may also be shared with another party associated with the customer, such as a family member or friend, such as on a separate device for such party. The customer, other party, the merchant, or the one or more interior designers, via their respective computing devices, may be able to provide control signals, such as touch screen inputs or the like, to change, manipulate, and/or move various components presented, simultaneously or asynchronously. In an example, a team of interior designers may work at the same time to position various home furnishings in a customer environment and then present the various arrangements to a customer, who may view these arrangements at a later time. Another party associated with the customer may separately view the arrangements on his computing device at the same time or a different time than the customer, and both may be enabled to view the augmented design arrangements from various angles when in the actual customer environment by providing one or more new customer supplied images, wherein the virtual objects will be sized, positioned, and oriented accordingly with respect to a new image. The customer supplied one or more images of the dining room and the augmented dining room may take the form of a single image, a set of images, or a video of the entire dining room including surrounding entrances, windows, doors, and the like, allowing for the showcasing and evaluation of various furnishings and arrangements.

With such an augmented reality application, the customer would exercise control over what portion of the environment to provide as background for the virtual object and could exercise control over a desired position/orientation of the virtual object. In addition, or in the alternative a merchant or other entity may exercise control over a desired position/orientation of the virtual object. The augmented reality application would provide customers new ways to evaluate and interact with various products and provide merchants the ability to showcase various features of these products and inspire desire for these products, in part by demonstrating suitability of a product for a particular customer location.

Figure 3:
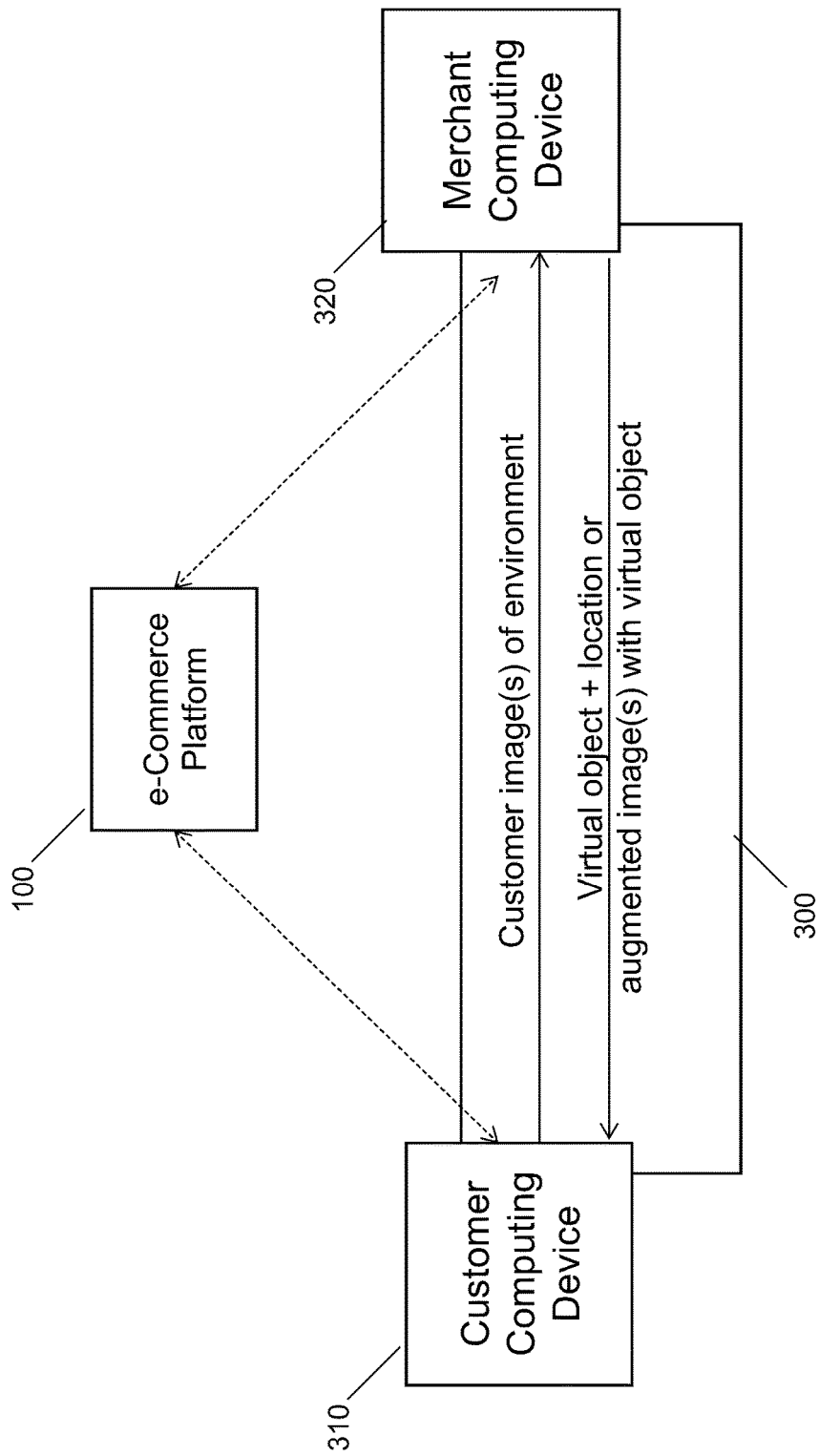
FIG. 3 depicts an embodiment of an augmented reality application, such as for overlaying a virtual object in an image.

FIG. 3 depicts an embodiment of an application 300 for overlaying a virtual object in one or more images. Computing and communication components for the application can exist at various locations such as at a customer computing device 310, at a merchant computing device 320, a separate server, and/or at the e-commerce platform 100, and the application may exist as part of, or outside of, e-commerce platform 100. Application components may be duplicated in various locations. Application components may include an interface module enabled to receive one or more customer images from a customer computing device, wherein the one or more customer images each depicts a customer environment, receive a selection of a merchant item for display, receive a positioning or repositioning signal corresponding to a desired location of virtual object in the customer environment. Application components may include a computing module comprising a processing engine and storage to execute processing related to determining 3D feature points and 3D feature data by evaluating one or more customer supplied images and other data, retrieving, creating, and resizing a virtual object corresponding to a selected item (such as a merchant product), creating an augmented image, set of images, or video such as by overlaying the virtual object at a selected or determined location in one or more customer supplied images (which may be provided from storage or in real time, for example as a real time video stream), and moving, repositioning, orienting, reorienting, sizing, or resizing the virtual object, or component parts of the virtual object, in one or more images of the customer-supplied images. In embodiments, 3D feature data may include one or more of camera position, camera orientation (including, without limitation, rotation, angle, roll, gamma, yaw, alpha, pitch, beta and the like), position of any detected surfaces, objects or features, the size and orientation of those surfaces, objects or features, planes, AR-related metadata and the like. In embodiments, 3D feature data may be associated with an image or series of images, for example captured at a rate equal to the frame rate of a video (such as 60 frames per second). In embodiments, the augmented reality of one or more images with the virtual object depicting a selected merchant product can be displayed on both a customer computing device and a merchant computing device (as well as other computing devices), and both customer and merchant (as well as others) can be enabled to control the movement, sizing, and orientation of the virtual object in the customer-supplied one or more images. In this way, a 3D model of the customer environment is not necessary, and those portions of a customer environment are provided as desired by a customer, such as via a camera on a customer computing device capturing one or more images of a potential site for a merchant product. In embodiments, a peer to peer type architecture can be used. In embodiments, screen mirroring can be used, such that a display at the customer computing device or other computing device is mirrored in the merchant computing device or another computing device.

Figure 4A:
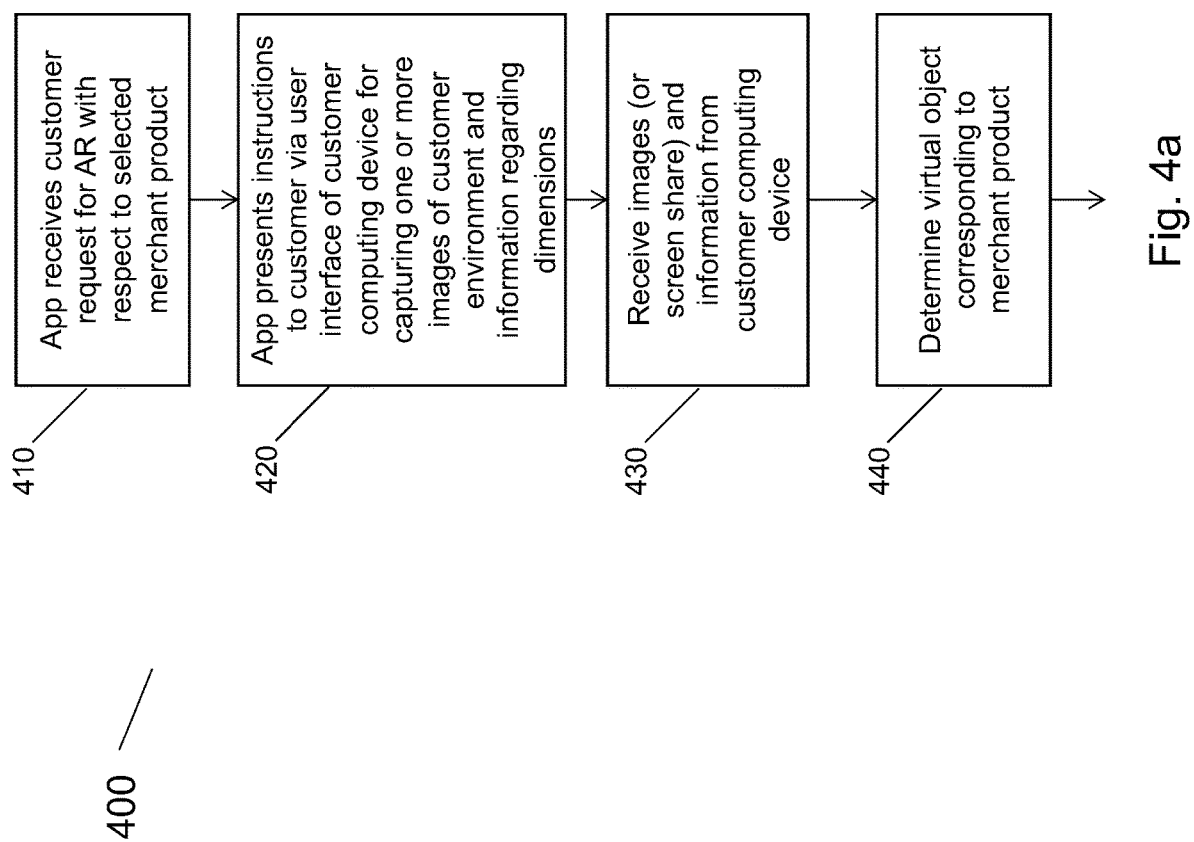
FIGS. 4*a-b* depict an example of a process for the exemplary application of FIG. 3.
Figure 4B:
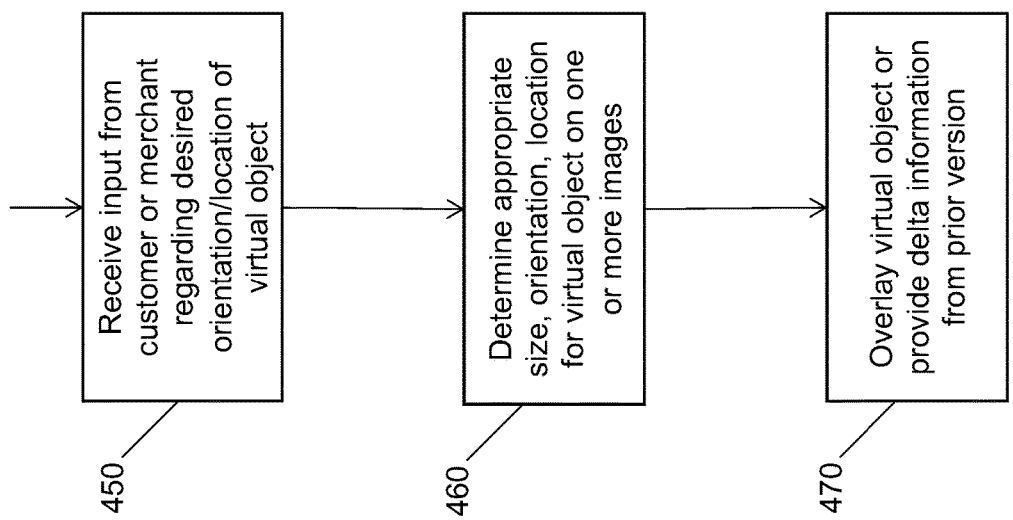

As illustrated in FIGS. 4a-b, an exemplary process 400 for augmenting one or more customer supplied images with one or more virtual objects depicting one or more selected merchant products may include the following steps. In embodiments, the e-commerce platform 100 may be configured to provide functionality via a graphical user interface for users to interact with an augmented reality application 300. For example, at a step 410, the application receives a customer request for augmented reality from a customer user, such as via a graphical user interface. In the example, the customer user or a merchant may select a desired merchant product to be viewed as a virtual object, which triggers a request to the application. Additionally, or in the alternative, at a step 420, the application may present, via the graphical user interface, instructions to the customer user to capture and/or upload one or more images or a video depicting a desired customer environment for the desired merchant product. The instructions may include information regarding providing one or more dimensions for one or more items in one or more images (e.g., the customer is instructed to provide an indication of a dimension between shelves of the set of shelves, or provide width, height, and depth dimensions of a cutout space in a kitchen into which a refrigerator may be inserted). The instructions may additionally request information regarding a desired location of the merchant product to be represented by the virtual object in an augmented one or more images. Other possibilities exist. For example, steps 410 and 420 may be omitted in other embodiments.

At a step 430, the augmented reality application 300 may receive a customer-supplied image, set of images, or video (such as in a compressed or uncompressed state) comprising one or more images depicting an environment of the customer. The application may also receive data regarding a dimension between identified and marked items depicted in the customer environment (such as a dimension between shelves or a size of a cutout space for a refrigerator), or the application may calculate a dimension based on the size of a product selected (i.e., the application assumes that a width dimension of the cutout space for a selected refrigerator corresponds to a width dimension of the selected refrigerator for sale or otherwise calculates the dimensions such as based on a reference object or properties of the camera capturing the images. The application may also receive information regarding an initial desired placement of the merchant product or may determine an initial placement based on a nature or type of the merchant product and an object recognition algorithm operating on one or more images of the received images (e.g., the initial placement of the virtual object representing a selected refrigerator is within a determined cutout recognized in images of the kitchen).

At a step 440, a virtual object corresponding to the merchant product is retrieved or created. For example, 3D models corresponding to merchant products may be stored in a library in the e-commerce platform (or elsewhere) or multiple 2D images of the product from various perspectives may be retrieved and manipulated to create an appropriate virtual object in known ways.

At a step 450, the application may receive a positioning signal, such as from the customer computing device or from the merchant computing device, where the positioning signal is indicative of a desired positioning of the virtual object or a component part of the virtual object in the customer environment, as represented in the one or more customer supplied images.

At a step 460, the application operates to determine an appropriate size, orientation, and/or position of the virtual object with respect to one or more determined locations depicted in the customer-supplied one or more images. This may occur by determining a correspondence between touch screen input signals of a user on a display showing the customer-supplied images and corresponding distances in one or more corresponding images, such that a location at which the virtual object or a component part of the virtual object should be moved to or oriented with respect to may be determined.

At a step 470, an augmented one or more images may be created in real time by overlaying the virtual object or a component part of the virtual object at a determined location, or a delta may be determined corresponding to amounts the virtual object should be moved in one or more dimensions with respect to a previous location and/or orientation. New size information of the virtual object could also be provided. The delta information and/or additional sizing information can be communicated back to the merchant and/or customer computing devices, and the virtual object adjusted accordingly in displayed image frames at the computing devices. In embodiments, any one or a combination of the steps described herein, including with respect to FIGS. 4a-b, may be performed by any one or more of the devices and software elements described herein.

FIGS. 5a-b depict an exemplary process 500 for augmenting customer supplied images with a virtual object, which is similar to exemplary process 400 but which includes software configured for determining 3D feature data corresponding to one or more items in an image. Such software may be native to a computing device or additive thereto. For example, the software can be used in conjunction with computing devices having a camera and other existing sensors (motion sensor, gyroscope, accelerometer, etc.) in order to define a coordinate system, and to use the defined coordinate system to track changes of the position and orientation of the camera between different acquired images. In such a manner, each acquired image is associated with a corresponding position and orientation of the camera in the defined coordinate system. For example, the software (hereafter also referred to as "AR software") may determine a defined coordinate system (e.g., x, y, z cartesian coordinates) having its origin (0, 0, 0) corresponding to where a computing device camera for acquiring images is located when a first image is acquired. The AR software, in conjunction with sensor data, enables the tracking of a location and an orientation of the camera relative to the defined coordinate system.

Further, the AR software may also determine the existence of planar surfaces or other features for items in or aspects of the captured images. For example, such an AR software tool may exist on a customer computing device and may allow for feature points such as edges to be recognized, such that a planar surface in an image (e.g., a shelf, a table, a rug, a counter, a wall, and the like) can be simply and easily determined. This 3D feature data relating to items in the image is useful for calculating location and orientation of virtual objects with respect to the defined coordinate system. This 3D feature data may also be used for recalibrating one image with respect to another, such as where a computing device is located in the customer environment and acquires a second image that needs to be oriented with respect to a first image with the defined coordinate system and origin at a particular location or is moved to a different physical location at a different point in time and needs to be oriented with respect to a coordinate system used at another point in time. The 3D feature data may or may not be communicated to the merchant computing device or to the e-commerce platform. As described herein, components of the application using the data from the AR software can be located at various locations, such as at the customer computing device, at the merchant computing device, at a remote server, or at any combinations of these locations and the overall architecture may be peer-to-peer or involve a server or cloud computing resource.

The AR data acquired may include camera position and orientation relative to origin of surfaces that are detected by the software as well as the size and orientation of those detected surfaces. For example, if a customer supplied image depicts a living room with a coffee table, the AR data may include dimensions of the table and orientation of its surface relative to the determined coordinate system. If a customer wants to view an augmented image in the customer environment but using a new image, the AR software is enabled to identify 3D feature points in the new image and line up the new image with respect to the defined coordinate system of the previous image such as by using, at least in part, 3D feature data of the previous image.

The e-commerce platform 100 may be configured to provide functionality via a graphical user interface for users to interact with an augmented reality application 300. For example, at a step 510, the augmented reality application may receive a customer request for augmented reality from a customer user via a graphical user interface such as a browser. In that example, a merchant may select, via a corresponding graphical user interface such as a browser, one or more desired merchant products to be viewed as a virtual object, which triggers a request to the application. In other embodiments, the customer may select one or more desired products to be viewed, or other parties could select one or more products to be viewed as one or more virtual objects.

Additionally, or alternatively, at a step 520, the application may present, via the graphical user interface, instructions to the customer user to capture and/or upload an image or set of images depicting a desired customer environment for the desired merchant product. A customer user may capture one or more discrete images using the camera of the customer computing device, may acquire a set of images by taking a video of a customer site, and/or may use a captured video to select one or more separate images of the customer site. The instructions may include information regarding use of the AR software to acquire 3D feature data regarding planar surfaces or other items or features in the images. The instructions may additionally request information regarding a desired position of the merchant product to be represented by the virtual object in an augmented one or more images. Other possibilities exist. For example, steps 510 and/or 520 may be omitted in other embodiments.

At a step 530, the customer-supplied image or set of images depicting an environment of the customer are processed by the AR software at the customer computing device or elsewhere (such as using a server, cloud computing resource or on a merchant device) in order to determine 3D feature data of identified items in the images. The AR software or application may also calculate dimensions in the images with respect to the defined coordinate system. The application may also receive information regarding an initial desired placement of the merchant product, or may determine an initial placement based on a nature or type of the merchant product and an object recognition algorithm operating on one or more customer supplied images (e.g., the initial placement of the virtual object representing a selected refrigerator is within a determined cutout recognized in images of the kitchen). A desired initial placement may be provided by a merchant, by a customer, or by another consultant (such as an interior designer) working with the merchant and/or customer.

At a step 540, a virtual object corresponding to the merchant product is retrieved or created. For example, 3D models corresponding to merchant products may be stored in a library in the e-commerce platform (or elsewhere) or multiple 2D images of the product from various perspectives may be retrieved and manipulated to create an appropriate virtual object in known ways.

At a step 550, the application may receive a positioning signal, such as from the customer computing device or from the merchant computing device or from another device, where the positioning signal is indicative of a desired position and/or size and/or orientation of the virtual object or a component part of the virtual object in the customer environment, as represented in the one or more customer supplied images.

At a step 560, the application operates to determine an appropriate size, orientation, and position of the virtual object with respect to one or more determined locations depicted in the customer-supplied one or more images and with respect to aspects of the 3D feature data. This step takes into account the received positioning signal as well as the 3D feature data in order to determine where to position the virtual object on a surface or item in the image, as more fully explained herein. Additionally, this step may determine a correspondence between touch screen input signals of a user on a display of a customer-supplied image and distances of items in the corresponding one or more images, such that a location at which the virtual object or a component part of the virtual object should be moved to or oriented with respect to may be determined. In embodiments, two or more users may add and/or position (via their respective device) different objects to an image during a same session. This may occur simultaneously or sequentially.

At a step 570, an augmented image or set of images may be created, in real time or asynchronously, by overlaying the virtual object or a component part of the virtual object at a determined location of a customer supplied image and displaying the augmented image or set of images on a customer computing device. In embodiments, a delta may be determined corresponding to amounts the virtual object should be moved in one or more dimensions with respect to a prior location in the determined coordinate system. The delta information can be communicated back to the merchant and/or another user and/or to the customer computing devices, and the virtual object adjusted accordingly in displayed images at either or both of the computing devices. In embodiments, an augmented image is created on a customer computing device and displayed on the customer computing device using different modules or components of the AR application. In embodiments, any one or a combination of the steps described herein, including with respect to FIGS. 5a-b, may be performed by any one or more of the devices and software elements described herein.

Additionally, more than one session may occur with respect to a given image, set of images or space, wherein each session may involve different objects and/or different positions for those objects. In embodiments, the application may have a toggle between modes enabled such that two or more different versions including a same set of 3D feature data can be maintained as separate versions or could be added together. Information may be tagged as belonging to a particular session. For example, an art consultant may present a version of a dining room that includes framed artworks on the walls with the virtual artwork objects being tagged to a first session. A furniture consultant may present a version of the dining room that includes a rug, a dining table, and a set of chairs, wherein these items are tagged to a second session. In a first mode, the two versions are presented separately, while in a second mode, the two versions are additive by pulling in the tagged data from both sessions to present a cumulative view.

For example, in a scenario where a customer computing device acquires one or more images and processes the one or more images to acquire the 3D feature data, the images and the 3D feature data may be communicated to the merchant computing device (or to a server of the platform controlling a website in communication with the merchant computing device) such that the merchant computing device or the server can compute appropriate location information (i.e., size, position, and orientation) for a virtual object in the one or more images. The location information of a virtual object may be determined with respect to the determined coordinate system of the camera, with such information available for each of the images, and can be sent back to the customer computing device such that an appropriate size, position, and orientation of the virtual object in each of the customer supplied images can be achieved. In embodiments, a merchant user may utilize a browser to access a website of the platform, the website having JavaScript to determine when a customer user has uploaded a customer supplied image. Such a website may use WebGL, which would allow for 3D rendering to occur in the merchant's browser in order to recreate a customer scene based on a "virtual camera" having a same position and orientation as the customer computing device camera when a corresponding image is captured. The 3D objects in the recreated scene would have matching size, position, and orientation as the detected items (such as planar surfaces) in the corresponding image. The website may overlay the recreated virtual scene on top of the corresponding image. A merchant user may drag virtual objects onto the scene. For example, the website can detect when the merchant user's mouse is on top of one of the detected 3D planar surfaces and determine the corresponding coordinates on the surface in order to place the virtual object in the scene at the corresponding location. The website may use JavaScript to send the coordinates and type of object back to the customer computing device, wherein the application augments the one or more images to have the virtual object in the desired location, and one or more images can be displayed, all at once or separately, on either or both displays of the customer computing device and the merchant computing device. Display and manipulation of virtual objects may occur in real time or asynchronously between a merchant user and a customer user.

If a customer user or other user wants to view an augmented image in the customer environment but is using a new image, the AR software may be enabled to identify 3D feature points in the new image and line up the new image with respect to the defined coordinate system of the previous image. For example, a customer or other user may open the AR application and take a second image of a customer environment from a location that is different than a first image, such as a few feet away from the first position, or using a different computing device. The application may be enabled to obtain 3D feature points from the second image and essentially line these up with 3D feature points of the first image such that the defined coordinate system of the first image is oriented to that of the second image. In this manner, the AR application may be enabled to appropriately, and in real time, position virtual objects in the second image.

Figure 6:
FIG. 6 depicts an exemplary set of augmented images showing a virtual vase on a coffee table from four different perspectives.

In another example, as shown in FIG. 6, an exemplary display of augmented images (such as in a browser) may include a set of images. As shown, a user has uploaded four or more images of a coffee table from different points of view. Each image has associated with it corresponding 3D feature data, such as a corresponding camera position and orientation and an identified surface corresponding to the top of the coffee table. A merchant user or other user, located outside of the customer environment and having received this data, may move the vase to a location on the coffee table. The location of the vase is replicated in each of the views such that the other images also show a vase in the same location but from different points of view, and each of the augmented images may be displayed for the customer to view at the same time or at a later time and for the merchant to also view. A customer user can then reposition the virtual vase in one of the images displayed on the customer computing device, and the changed position of the vase is replicated for the other images as moving the virtual vase in one image would operate to move the vase in each of the other images in a corresponding way. In embodiments, this may be done in an interactive manner or asynchronously. In embodiments, only one image with corresponding 3D feature data needs to be shared to achieve the functionality described herein.

In an embodiment of a use case, a prospective customer may take photos of their coffee table from different angles using an AR enabled device. Another user, an interior designer, may view the photos of the coffee table in a browser and can drag virtual objects (such as 3D objects) into the photos and the products will appear in the images, synchronized and simultaneously across all of the images, at the correct distance and perspective. The prospective customer may also see the virtual objects appear in the images, but also in AR where they can walk around to see the virtual objects in place from different angles. In another embodiment, the prospective customer may later place other virtual objects into the pictures, but without necessarily having access to the actual space with the coffee table at the time, instead using the images captured previously. This may be done using a browser extension. In addition, it may be possible to have multiple browser windows open, with the changes reflected in real time on each browser window, allowing for real time collaboration. In embodiments, it may be possible to conduct contests, for example where images of an empty living room (along with associated 3D feature data) are shared, contestants can decorate the space with virtual objects and share their creations with other participants.

In embodiments, only a small amount of data corresponding to the customer acquired image or set of images may need to be transmitted between devices, reducing bandwidth requirements and speeding processing. In embodiments, complete or partial coordinate, positioning and orientation data for the virtual object may be transmitted. In embodiments, the space in a set of images may be mapped on to a real coordinate system and used to track the virtual object. In other embodiments, the position of the virtual object may be tracked in relation to another object or reference point in a set of images and changes in the position of the virtual object may simply be tracked as changes in position with respect to that object or reference point in respect of the set of images, requiring less data to be transmitted than in respect of complete or partial coordinates as described above. In embodiments, when the position or aspects of the virtual object are manipulated from a device not capturing the images, such device may only need to transmit the change in position, as opposed to composing the virtual object into the video stream for transmission, reducing the amount of data to be transmitted. In embodiments, the device not capturing the images may simply transmit user inputs and such inputs are mapped on the device capturing the images or another device to represent native inputs on such device which are processed to manipulate the virtual object, which may further reduce the data to be transmitted. For example, such data may include the instruction type (such as add an object or move object), the identity of the object (such as blue vase) and the touch/screen coordinates for the object (such as X, Y), where such coordinates are the location where the screen was touched and not 3D coordinates. In embodiments, image data, such as from various view points, may be transmitted instead of video data. In embodiments, 3D feature data may be transmitted along with the corresponding image, set of images or video. In embodiments, transmitting an image of a space along with corresponding 3D feature data may be less bandwidth intensive than transmitting a video of the space without corresponding 3D feature data.

In embodiments, the disclosure herein provides for improved security since the customer maintains control over the aspects of the space visible to the merchant (such as due to the fact that the merchant is not provided with a full 3D model of the space and can only view the aspects shown by the customer). In embodiments, the disclosure herein provides for improved security since the customer does not need to grant the merchant access to the customer device for the merchant to manipulate virtual objects in the space. In embodiments, the customer may create a video of a space, but then select only certain images from that video and share those, along with the corresponding 3D feature data. This allows the customer to maintain control over the information shared and also reduces the bandwidth, processing and other resources required.

In embodiments, the interactions between the customer and the merchant may be synchronous (such as through a real time set of images, which may be a video) or asynchronous (such as through a recorded set of images, which may be a video). In embodiments, a customer may share a recorded or stored one or more images of a space with a merchant. The merchant may position one or more virtual objects in the space using the recorded or stored one or more images. When the customer views the recorded one or more images, the customer may be able to see the virtual objects positioned by the merchant. When the customer views the real space using the customer's mobile device the customer (such as through use of the augmented reality application 300) may be able to see the virtual objects in a real time image or camera feed viewed on the customer device or shared with another device. In embodiments, these asynchronous interactions may be helpful where a user at a store stores or records one or more images of a shelf layout which is shared with a merchant wishing to sell products in such store. The merchant can use the stored or recorded video to position virtual products on the selves. Using the augmented reality application 300 the user at the store may later view the shelves in real time using their mobile device and see the virtual products placed on such shelves by the merchant, such products placed using the recorded one or more images. This may allow the user in the store to place corresponding real objects on the shelves based on mirroring the placement of the virtual objects.

In embodiments, the virtual object may exist in a database or other repository of virtual objects. In embodiments, the virtual object may be created from a photograph or video of a real object created using a mobile or other device.

While the disclosure throughout generally contemplates providing augmented reality images, sets of images and/or video with a virtual object of a merchant product in a customer-supplied image or sets or series of images (such as video), such systems and methods can be generalized to other use cases. In addition, while the disclosure throughout generally contemplates one or more products from a merchant, the disclosure is also applicable to services from a merchant, such as installation, remodeling, painting, cleaning and other services, including services which may alter the space (including, without limitation, a surface of the space) shown in one or more images, and where the experience can show the space before and after performance of a service.

The terms transmission, communication, receiving and the like used herein, such as in relation to images, video, video streams, data (including 3D feature data) and the like, may refer to transmission, communication, receiving and the like within a given device (such as between modules, software components or hardware components of or on the device), within software on a given device or may be between devices, such as over a network.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices.

The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method for augmenting a plurality of customer images with at least one virtual object, the method comprising:
    receiving the plurality of customer images from a first computing device, wherein the plurality of customer images depicts portions of a customer environment as captured from different perspectives;
    determining 3D feature data corresponding to each of the plurality of customer images, wherein respective defined coordinate systems for 3D spaces corresponding to each of the plurality of customer images are defined and oriented relative to the coordinate systems of other customer images of the plurality of customer images;
    receiving a selection of a merchant item for display;
    determining the at least one virtual object corresponding to the selection of the merchant item;
    receiving a positioning signal corresponding to a desired location of the at least one virtual object in the customer environment, the positioning signal identifying a position for the at least one virtual object relative to a first one of the plurality of customer images;
    determining a first location in the respective defined coordinate system for the 3D space corresponding to the first one of the plurality of customer images based on the position for the at least one virtual object identified by the positioning signal;
    determining an appropriate size and orientation for depicting the at least one virtual object in the first one of the plurality of customer images based on the first location and the 3D feature data corresponding to the first one of the plurality of customer images;
    determining, based on the first location, first corresponding locations in the respective defined coordinate systems for the 3D spaces corresponding to the plurality of customer images other than first one of the plurality of customer images based on orientations of those coordinate systems relative to the coordinate system for the 3D space corresponding to the first one of the plurality of customer images;
    determining appropriate sizes and orientations for depicting the at least one virtual object in the plurality of customer images other than the first one of the plurality of customer images based on the first corresponding locations and the 3D feature data corresponding to the plurality of customer images other than the first one of the plurality of customer images;
    causing overlays of the appropriately sized and oriented depictions of the at least one virtual object at the first location and the first corresponding locations for each of the plurality of customer images;
    receiving a re-positioning signal indicative of a desired re-positioning of the at least one virtual object from a second computing device, the re-positioning signal identifying an updated position for the at least one virtual object relative to a second one of the plurality of customer images;
    determining a second location in the respective defined coordinate system for the 3D space corresponding to the second one of the plurality of customer images at which to overlay the at least one virtual object in response to the re-positioning signal;
    determining, based on the second location, second corresponding locations in the respective defined coordinate systems for the 3D spaces corresponding to the customer images other than second one of the plurality of customer images based on the orientations of those coordinate systems relative to the coordinate system for the 3D space corresponding to the second one of the plurality of customer images;
    determining appropriate sizes and orientations for depicting the at least one virtual object in the plurality of customer images based on the second location, the second corresponding locations, and the 3D feature data corresponding to the plurality of customer images; and
    causing updated overlays of the appropriately sized and oriented depictions of the at least one virtual object at the second location and the second corresponding locations in the plurality of customer images.

2. The method of claim 1, wherein the causing the overlays includes transmitting at least one of the appropriately sized and oriented depictions of the at least one virtual object or the first location to the first computing device.

3. The method of claim 1, further comprising creating an augmented image for the first one of the plurality of customer images with the overlay of the appropriately sized and oriented depiction of the at least one virtual object at the first location for display on the first computing device.

4. The method of claim 3, further comprising creating an augmented image for the first one of the plurality of customer images with the overlay of the appropriately sized and oriented depiction of the at least one virtual object at the first location for display on the second computing device.

5. The method of claim 4, wherein the first computing device and the second computing device are in a peer to peer relationship.

6. The method of claim 1, wherein the causing the updated overlays includes transmitting at least one of the appropriately sized and oriented depictions of the at least one virtual object and the second location to the first computing device.

7. The method of claim 1, further comprising creating an updated augmented image for the second one of the plurality of customer images with the updated overlays for display on the first computing device.

8. The method of claim 1, further comprising creating an updated augmented image for the second one of the plurality of customer images with the updated overlays for display on the second computing device.

9. The method of claim 1, further comprising creating an augmented image for the plurality of customer images with the overlays, wherein the augmented image is created responsive to receiving the plurality of customer images from the first computing device.

10. The method of claim 9, wherein the augmented image for the plurality of customer images is created and displayed at a different time than the receipt of the plurality of customer images from the first computing device.

11. A computer-implemented method for augmenting a plurality of images of a site with a virtual object, the method comprising:
    capturing the plurality of images by a first computing device, wherein the plurality of images depicts portions of a potential site for the virtual object captured from different perspectives;
    determining, by the first computing device, 3D feature data corresponding to each of the plurality of images, wherein respective defined coordinate systems for 3D spaces corresponding to each of the plurality of images are defined and oriented relative to the coordinate systems of other images of the plurality of images;
    communicating the plurality of images and the 3D feature data to a second computing device, wherein the second computing device is in a peer to peer relationship with the first computing device;
    determining, by the second computing device, a first location in the respective defined coordinate system for the 3D space corresponding to a first one of the plurality of images;
    determining, by the second computing device, an appropriate size and orientation for depicting the virtual object in the first one of the plurality of images based on the first location and 3D feature data corresponding to the first one of the plurality of images;
    determining, based on the first location, first corresponding locations in the respective defined coordinate systems for the 3D spaces corresponding to the plurality of images other than first one of the plurality of images based on orientations of those coordinate systems relative to the coordinate system for the 3D space corresponding to the first one of the plurality of images;
    determining appropriate sizes and orientations for depicting the virtual object in the plurality of images other than the first one of the plurality of images based on the first corresponding locations and the 3D feature data corresponding to the plurality of images other than the first one of the plurality of images;
    creating, by the first computing device or the second computing device, a plurality of augmented images for display on the first computing device by overlaying appropriately sized and oriented depictions of the virtual object at the first location and the first corresponding locations for each of the plurality of images;
    receiving a re-positioning signal indicative of a desired re-positioning of the virtual object from the second computing device, the re-positioning signal identifying an updated position for the virtual object relative to a second one of the plurality of images;
    determining a second location in the respective defined coordinate system for the 3D space corresponding to the second one of the plurality of images at which to overlay the virtual object in response to the re-positioning signal;
    determining, based on the second location, second corresponding locations in the respective defined coordinate systems for the 3D spaces corresponding to the images other than second one of the plurality of images based on the orientations of those coordinate systems relative to the coordinate system for the 3D space corresponding to the second one of the plurality of images;
    determining appropriate sizes and orientations for depicting the virtual object in the plurality of images based on the second location, the second corresponding locations, and the 3D feature data corresponding to the plurality of customer images; and
    causing updated overlays of the appropriately sized and oriented depictions of the virtual object at the second location and the second corresponding locations in the plurality of customer images.

12. A computer system for augmenting a plurality of images of a site with a virtual object, the system comprising:
    a processor; and
    a non-transitory computer readable medium structured to store instructions that, when executed by the processor, cause the processor to:
        receive the plurality of images from a first computing device, wherein the plurality of images depicts portions of a potential site for the virtual object as captured from different perspectives,
        receive the virtual object for display, and receive a positioning signal corresponding to a desired location of the virtual object, the positioning signal identifying a position for the virtual object relative to a first one of the plurality of images,
        determine 3D feature data corresponding to each of the plurality of images, wherein respective defined coordinate systems for 3D spaces corresponding to each of the plurality of images are defined and oriented relative to the coordinate systems of other images of the plurality of images,
        determine a first location in the respective defined coordinate system for the 3D space corresponding to the first one of the plurality of images based on the position for the virtual object identified by the positioning signal, determine an appropriate size and orientation for depicting the virtual object in the first one of the plurality of images based on the first location and the 3D feature data corresponding to the first one of the plurality of images, determine, based on the first location, first corresponding locations in the respective defined coordinate systems for the 3D spaces corresponding to the plurality of images other than first one of the plurality of images based on orientations of those coordinate systems relative to the coordinate system for the 3D space corresponding to the first one of the plurality of images, determine appropriate sizes and orientations for depicting the virtual object in the plurality of images other than the first one of the plurality of images based on the first corresponding locations and the 3D feature data corresponding to the plurality of images other than the first one of the plurality of images, cause overlays of the appropriately sized and oriented depictions of the virtual object at the first location and the first corresponding locations in each of the plurality of images, receive a re-positioning signal indicative of a desired re-positioning of the virtual object from a second computing device, the re-positioning signal identifying an updated position for the virtual object relative to a second one of the plurality of images, determine a second location in the respective defined coordinate system for the 3D space corresponding to the second one of the plurality of images at which to overlay the virtual object in response to the re-positioning signal, determining, based on the second location, second corresponding locations in the respective defined coordinate systems for the 3D spaces corresponding to the images other than second one of the plurality of images based on the orientations of those coordinate systems relative to the coordinate system for the 3D space corresponding to the second one of the plurality of images, determining appropriate sizes and orientations for depicting the virtual object in the plurality of images based on the second location, the second corresponding locations, and the 3D feature data corresponding to the plurality of images, and cause updated overlays of the appropriately sized and oriented depictions of the virtual object at the second location and the second corresponding locations in the plurality of images.

13. The system of claim 12, wherein the computer system is structured to transmit at least one of the appropriately sized and oriented depictions of the virtual object and the first location to the first computing device.

14. The system of claim 12, further wherein the computer system is structured to create an augmented image for the first one of the plurality of images with the overlay of the appropriately sized and oriented depiction of the virtual object at the first location for display on the first computing device.

15. The system of claim 12, wherein the 3D feature data includes a determined coordinate system relative to a camera of the first computing device.

16. The system of claim 14, wherein the 3D feature data includes location and size of planar surfaces.

17. A computer-implemented system for augmenting a plurality of customer images with at least one virtual object, the system comprising:

a processor; and a non-transitory computer readable medium structured to store instructions that, when executed by the processor, cause the processor to:

receive the plurality of customer images from a first computing device, wherein the plurality of customer images each depict portions of a customer environment, as captured from different perspectives, receive a selection of a merchant item for display, receive a positioning signal corresponding to a desired location of the at least one virtual object in the customer environment, the positioning signal identifying a position for the at least one virtual object relative to a first one of the plurality of customer images, determine 3D feature data corresponding to the plurality of customer images, wherein respective defined coordinate systems for 3D spaces corresponding to each of the plurality of customer images are defined and oriented relative to the coordinate systems of other customer images of the plurality of customer images, determine the at least one virtual object corresponding to the selection of the merchant item, determine a first location in the respective defined coordinate system for the 3D space corresponding to the first one of the plurality of customer images based on the position from the at least one virtual object identified by the positioning signal, determine an appropriate size and orientation for depicting the at least one virtual object in the first one of the plurality of customer images based on the first location and the 3D feature data corresponding to the first one of the plurality of customer images, determine, based on the first location, first corresponding locations in the respective defined coordinate systems for the 3D spaces corresponding to the plurality of customer images other than first one of the plurality of customer images based on orientations of those coordinate systems relative to the coordinate system for the 3D space corresponding to the first one of the plurality of customer images, determine appropriate sizes and orientations for depicting the at least one virtual object in the plurality of customer images other than the first one of the plurality of customer images based on the first corresponding locations and the 3D feature data corresponding to the plurality of customer images other than the first one of the plurality of customer images, create an augmented image for each of the plurality of customer images for display on the first computing device by overlaying the appropriately sized and oriented depictions of the at least one virtual object at the first location and the first corresponding locations for each of the plurality of customer images, receive a re-positioning signal indicative of a desired re-positioning of the at least one virtual object from a second computing device, the re-positioning signal identifying an updated position for the at least one virtual object relative to a second one of the plurality of customer images, determine a second location in the respective defined coordinate system for the 3D space corresponding to the second one of the plurality of at which to overlay the at least one virtual object in response to the re-positioning signal, determine, based on the second location, second corresponding locations in the respective defined coordinate systems for the 3D spaces corresponding to the customer images other than second one of the plurality of customer images based on the orientations of those coordinate systems relative to the coordinate system for the 3D space corresponding to the second one of the plurality of customer images, determine appropriate sizes and orientations for depicting the at least one virtual object in the plurality of customer images based on the second location, the second corresponding locations, and the 3D feature data corresponding to the plurality of customer images, and cause updated overlays of the appropriately sized and oriented depictions of the at least one virtual object at the second location and the second corresponding locations in the plurality of customer images.

18. The system of claim 17, wherein the augmented image is enabled for display on the second computing device.

19. The system of claim 18, wherein the first computing device and the second computing device are in a peer to peer relationship.

20. The system of claim 17, wherein the augmented image is created in real time with the receipt of the plurality of customer images from the first computing device.

21. The system of claim 17, wherein the augmented image for each of the plurality of customer images is created and displayed at a different time than the receipt of the plurality of customer images from the first computing device.

22. The method of claim 10, further comprising creating an updated augmented image for the second one of the plurality of images with the updated overlays for display on the first computing device.

23. The method of claim 10, wherein the augmented image is created responsive to the receipt of the plurality of images from the first computing device.

24. The method of claim 10, wherein the augmented image is created and displayed at a different time than the receipt of the plurality of images from the first computing device.

* * * * *